(12) United States Patent
Fu

(10) Patent No.: US 6,249,748 B1
(45) Date of Patent: Jun. 19, 2001

(54) APPARATUS AND METHOD FOR DETERMINING A FLOW RATE OF A FLUID SUBSTANCE DISCHARGED FROM A RESERVING DEVICE

(75) Inventor: Wu-Hsiung Fu, Hsin Chu (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/207,736

(22) Filed: Dec. 8, 1998

(51) Int. Cl.$^7$ .................................................. G01F 1/00
(52) U.S. Cl. ........................ 702/45; 702/50; 702/138; 73/861
(58) Field of Search .................... 702/45, 47, 50, 702/116, 136, 138; 700/275, 282, 301; 73/19.04, 19.05, 262, 270, 861, 861.357, 861.28

(56) References Cited

U.S. PATENT DOCUMENTS

| | | | |
|---|---|---|---|
| 4,108,574 | * | 8/1978 | Bartley et al. .................... 417/19 |
| 4,109,524 | * | 8/1978 | Smith ............................. 73/861.357 |
| 4,315,523 | * | 2/1982 | Mahawili et al. ................. 73/269 |
| 4,633,719 | * | 1/1987 | Vander Heyden ............... 73/861.28 |
| 4,669,308 | * | 6/1987 | Jorritsma ......................... 73/861 |
| 5,295,083 | * | 3/1994 | Yano et al. ...................... 702/50 |
| 5,526,685 | * | 6/1996 | Davis ............................... 73/262 |
| 5,966,674 | * | 10/1999 | Crawford et al. ................ 702/45 |

* cited by examiner

Primary Examiner—Kamini Shah
Assistant Examiner—Bryan Bui
(74) Attorney, Agent, or Firm—Alston & Bird LLP

(57) ABSTRACT

An apparatus for determining a flow rate of fluid substance discharged from a reserving device includes an instantaneous sensor for measuring an instantaneous state parameter of the fluid substance stored in the reserving device and a data processor electrically connecting with the instantaneous sensor for calculating the flow rate of the fluid substance according to the instantaneous state parameter. The reserving device includes a reservoir for storing the fluid substance, a controlling valve linked to the reservoir for adjusting the flow rate of the fluid substance, and a tube linked to the valve for transporting the fluid substance. The flow rate of the fluid substance is determined by an equation $$\dot{m} = -\frac{dm_{r,t}}{dt} = -\frac{1}{\gamma}\frac{m_{r,t=0}}{P_{r,t}}\left[\frac{P_{r,t}}{P_{r,t=0}}\right]^{\frac{1}{\gamma}}\frac{dP_{r,t}}{dt}$$

where $\dot{m}$ is the flow rate of the fluid substance, $m_{r,t}$ is the mass of the fluid substance in the reserving device, $m_{r,t=0}$ is the initial mass of the fluid substance in the reserving device, $P_{r,t=0}$ is the initial pressure in the reserving device, $P_{r,t}$ is the pressure varying with time in the reserving device, and $\gamma$ is the specific heat ratio of the fluid substance. The error is less than 6%.

12 Claims, 5 Drawing Sheets

APPARATUS AND METHOD FOR DETERMINING A FLOW RATE OF A FLUID SUBSTANCE DISCHARGED FROM A RESERVING DEVICE

FIELD OF THE INVENTION

The present invention relates to an apparatus and a method for determining a flow rate, and more particularly to an apparatus and a method for determining a flow rate of a fluid substance discharged from a reserving device.

BACKGROUND OF THE INVENTION

Conventionally, the process of a fluid substance discharged from a reservoir is controlled by a valve for providing the fluid substance at the specific time, and it is widely used in the industry. For example, a dust collector with a bag filter takes advantage of high pressure air discharged from a reservoir to clean the dust on a filter and then collect the dust in the bag. Most of valves applied in an automatic control system for driving an operating unit or in a reservoir for introducing the required air into every operating unit are electromagnetic valves.

As we know, the pressure and the temperature in the reservoir will change during the discharged process, and the properties of the fluid substance in the reservoir will also vary all the time. So, it is hard to measure the accurate flow rate of the fluid substance discharged from the reservoir.

In the commonly used flow meter in the industry, such as the orifice meter or the venturi meter, there is a difference in pressure between the upstream and downstream regions of the valve. In other words, these kinds of flow meters are just suitable for the fluid substance in a steady state, and the flow rate of the fluid substance is usually indicated by pressure differences between the upstream and downstream regions of the flow meter.

For convenience, the Instrument Society of American proposed a measurement for determining the flow rate (American National Standard). Referring to FIG. 1, a reservoir 11 is connected with a throttle 12, a thermocouple 13, and a flow meter 14 in series. Two pressure taps 15,16 are provided at the upstream and downstream regions of the valve 17 in the testing area 18. The method for calculating the flow rate is to determine the difference in pressure at the pressure taps 15,16. This equipment needs a great amount of the fluid substance to maintain a steady state during the discharged process, but it is hard for a factory to set up such a flow meter with a huge volume of the fluid substance. More importantly, the condition of a valve used in the discharged process, e.g. an electromagnetic valve, is usually in a dynamic state, rather than in a steady state (unless the pressure is low). However, it is not reasonable the flow rate of the fluid substance in a steady state is used to represent all the conditions of the fluid substance (including the dynamic state). So, it is tried by the applicant to deal with this problem encountered by the prior art.

SUMMARY OF THE INVENTION

Therefore, a major object of the present invention is to provide a method and an apparatus for determining a flow rate of a fluid substance discharged from a reserving device.

The apparatus according to the present invention includes an instantaneous sensor for measuring an instantaneous state parameter of the fluid substance stored in the reserving device and a data processor electrically connected with the instantaneous sensor for calculating the flow rate of the fluid substance according to the instantaneous state parameter.

In accordance with an aspect of the present invention, the reserving device includes a reservoir for storing the fluid substance, a controlling valve linked to the reservoir for adjusting the flow rate of the fluid substance, and a tube linked to the valve for transporting the fluid substance.

In accordance with another aspect of the present invention, the controlling valve further includes an adjustable valve connected to the reservoir for enabling/disabling the fluid substance to be discharged from the reservoir, and a controller electrically connected to the adjustable valve for controlling the adjustable valve.

In accordance with another aspect of the present invention, the adjustable valve is one selected from a group consisting of a ball valve, an electromagnetic valve, and a diaphragm valve.

In accordance with another aspect of the present invention, the instantaneous sensor is a thermocouple when the state parameter is the temperature of the fluid substance.

In accordance with another aspect of the present invention, the instantaneous sensor is a manometer when the state parameter is the pressure of the fluid substance.

In accordance with another aspect of the present invention, the data processor is a computer.

In accordance with another aspect of the present invention, the flow rate of the fluid substance is determined by an equation $$\dot{m} = -\frac{dm_{r,t}}{dt} = -\frac{1}{\gamma}\frac{m_{r,t=0}}{P_{r,t}}\left[\frac{P_{r,t}}{P_{r,t=0}}\right]^{\frac{1}{\gamma}}\frac{dP_{r,t}}{dt}$$

where m is the flow rate of the fluid substance, $m_{r,t}$ is the mass of the fluid substance in the reserving device, $m_{r,t=0}$ is the initial mass of the fluid substance in the reserving device, $P_{r,t=0}$ is the initial pressure in the reserving device, $P_{r,t}$ is the pressure varying with time in the reserving device, and $\gamma$ is the specific heat ratio of the fluid substance.

In accordance with another aspect of the present invention, the flow rate of the fluid substance can also be determined by an equation $$\dot{m} = (1-\gamma)m_{r,t=0}\left[\frac{T_{r,t}}{T_{r,t=0}}\right]^{\left(\frac{2-\gamma}{\gamma-1}\right)}\frac{dT_{r,t}}{dt}$$

where m is the flow rate of the fluid substance, $m_{r,t=0}$ is the initial mass of the fluid substance in the reserving device, $T_{r,t=0}$ is the initial temperature in the reserving device, $T_{r,t}$ is the temperature varying with time in the reserving device, and $\gamma$ is the specific heat ratio of the fluid substance.

In accordance with another aspect of the present invention, a method for determining a flow rate of a fluid substance discharged from a reserving device includes steps of (a) calculating an initial mass $m_{r,t=0}$ of the fluid substance in the reserving device, (b) defining a discharged time and then discharging the fluid substance from the reserving device, (c) measuring a pressure $P_{r,t}$ in the reserving device, (d) measuring a temperature $T_{r,t}$ in the reserving device, and (e) calculating the flow rate m of the fluid substance.

In accordance with another aspect of the present invention, the step (a) further includes steps of measuring an initial pressure $P_{r,t=0}$ in the reserving device, measuring an initial temperature $T_{r,t=0}$ in the reserving device, and calculating the initial mass of the fluid substance by an equation PV=mRT.

The present invention may best be understood through the following description with reference to the accompanying drawings, in which:

DETAILED DESCRIPTION OF THE PREFERRED EMBODIMENTS

Figure 1:
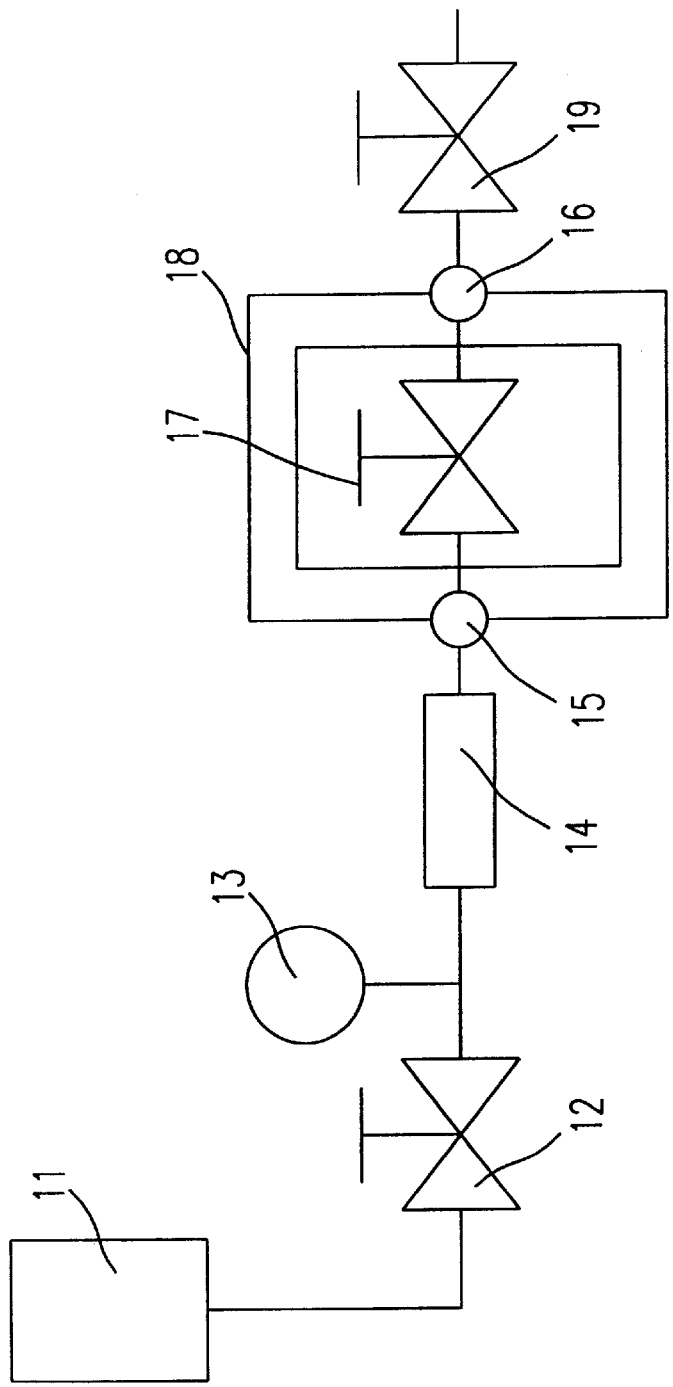
FIG. 1 is a schematic diagram showing the structure of a reserving device of the prior art.
Figure 2:
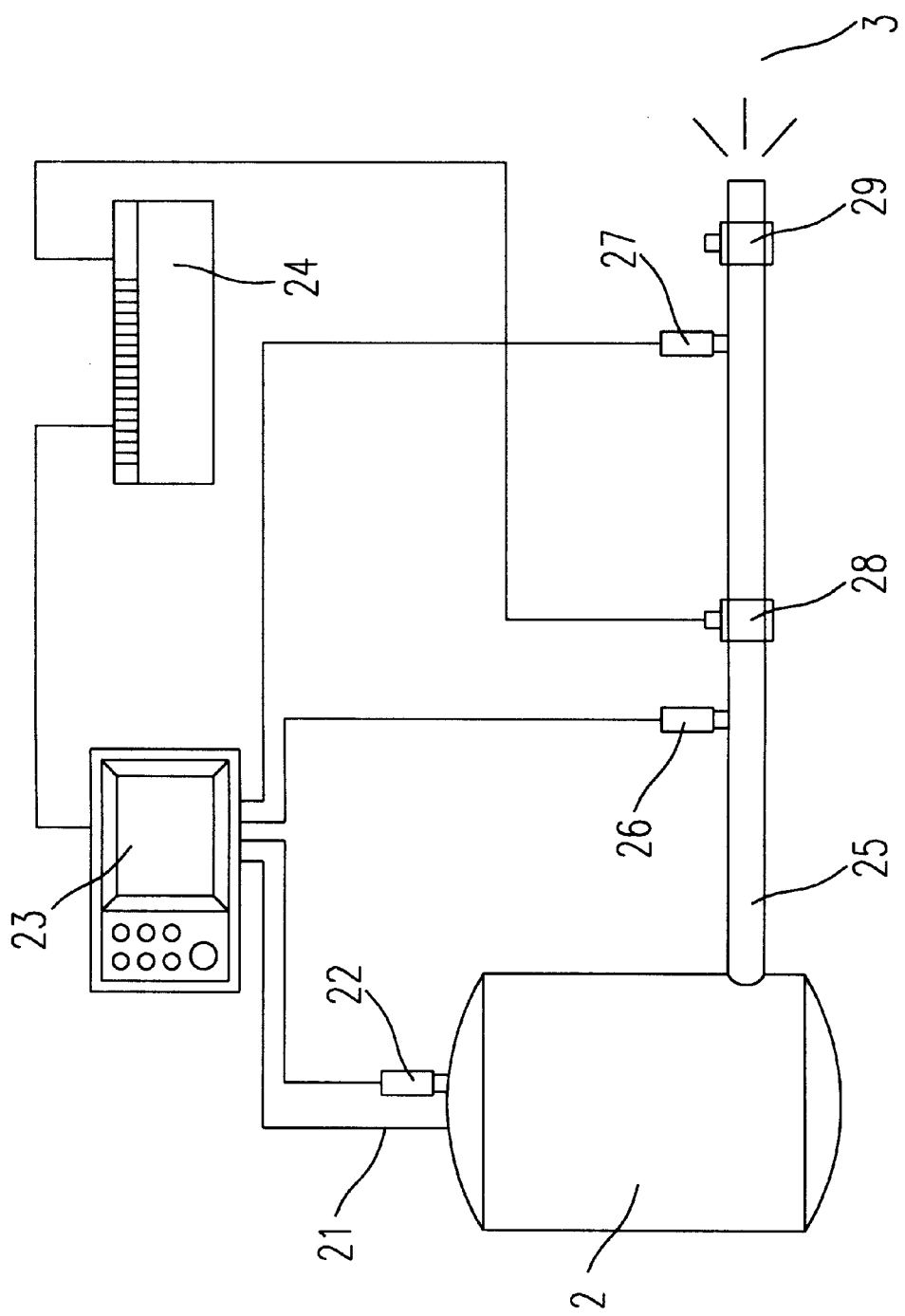
FIG. 2 is a schematic diagram showing a preferred embodiment of an apparatus for determining a flow rate of a fluid substance discharged from a reserving device according to the present invention.

The apparatus for determining a flow rate of a fluid substance discharged from a reserving device according to the present invention is shown in FIG. 2. Referring to FIG. 2, the reserving device 2 has a thermal couple 21 and a manometer 22 thereon for determining the temperature and the pressure in the reserving device 2. A tube 25 for transporting the fluid substance is linked to the reserving device 2, and a valve 28 and a throttle 29 are positioned on the tube. The time of discharging the fluid substance from the reserving device 2 is adjusted by the valve 28 which is controlled by the programmable logic controller 24 or the throttle 29. There are two manometers 26, 27 provided on the upstream and downstream positions of the valve 28 for determining the pressures at these two positions. The instantaneous flow rate of the fluid substance can be calculated from the pressure difference. All results are recorded by the data processor 23.

The instantaneous flow rate of the fluid substance is calculated by an equation which is applied in an adiabatic process. First of all, the ideal gas equation PV=mRT is differentiated as $$V \frac{dP_{r,t}}{dt} = m_{r,t} R \frac{dT_{r,t}}{dt} + R T_{r,t} \frac{dm_{r,t}}{dt}; \qquad (1)$$

$$\frac{dm_{r,t}}{dt}$$

is the instantaneous change of the fluid substance in the reserving device. The loss of the internal energy (e) during the discharged process is the same as the enthalpy (h) taken by the fluid substance.

$$\frac{d}{dt}(m_{r,t}, e_{r,t}) = \frac{dm_{r,t}}{dt} h_{r,t} \qquad (2)$$

$$\gamma = \frac{C_p}{C_v}$$

Then, the instantaneous flow rate of the fluid substance is $$\frac{dm_{r,t}}{dt} = \frac{1}{\gamma - 1} \frac{m_{r,t}}{T_{r,t}} \cdot \frac{dT_{r,t}}{dt}; \qquad (3)$$

Eq. (3) is integrated as $$m_{r,t} = m_{r,t=0} \cdot \left[ \frac{T_{r,t}}{T_{r,t=0}} \right]^{\frac{1}{\gamma-1}}; \qquad (4)$$

Eq. (1) is combined with Eq. (4) and the pressure difference in the reserving device is shown below.

$$\frac{dP_{r,t}}{dt} = \frac{\gamma P_{r,t}}{m_{r,t}} \cdot \frac{dm_{r,t}}{dt} \qquad (5)$$

The remains of the fluid substance in the reserving device $m_{r,t}$ can be shown as:

$$m_{r,t} = m_{r,t=0} \cdot \left[ \frac{P_{r,t}}{P_{r,t=0}} \right]^{\frac{1}{\gamma}} \qquad (6)$$

Eq. (6) is combined with Eq. (4) and the temperature in the reserving device is shown below.

$$T_{r,t} = T_{r,t=0} \cdot \left[ \frac{P_{r,t}}{P_{r,t=0}} \right]^{\frac{\gamma-1}{\gamma}} \qquad (7)$$

By combining Eq. (6) and Eq. (7) with Eq. (5), the instantaneous flow rate of the fluid substance ṁ can be shown as follows. The instantaneous flow rate of the fluid substance m is the same as the instantaneous change of the fluid substance in the reserving device.

$$\left( -\frac{dm_{r,t}}{dt} \right) \qquad (8)$$

$$\dot{m} = -\frac{dm_{r,t}}{dt} = -\frac{1}{\gamma} \frac{m_{r,t=0}}{P_{r,t}} \left[ \frac{P_{r,t}}{P_{r,t=0}} \right]^{\frac{1}{\gamma}} \frac{dP_{r,t}}{dt}$$

In other words, the instantaneous flow rate of the fluid substance can be calculated from Eq. (8) after determining the pressure $P_{r,t}$ in the reserving device.

The initial pressure $P_{r,t=0}$ and temperature $T_{r,t=0}$ in the reversing device is determined in order to calculate the initial mass of the fluid substance $m_{r,t=0}$. After defining the discharged time of the valve and the throttle, the fluid substance is discharged from the reserving device. The pressure $P_{r,t}$ in the reversing device is determined by the manometer 22, then the amount of $$\frac{dP_{r,t}}{dt}$$

can be calculated. Finally, the instantaneous mass ṁ of the fluid substance can be calculated by Eq. (8)

$$\dot{m} = -\frac{dm_{r,t}}{dt} = -\frac{1}{\gamma} \frac{m_{r,t=0}}{P_{r,t}} \left[ \frac{P_{r,t}}{P_{r,t=0}} \right]^{\frac{1}{\gamma}} \frac{dP_{r,t}}{dt}.$$

When the pressure in the upstream region of the valve $P_{u,t}$ and the pressure in the downstream region of the valve $P_{d,t}$ are determined, we obtain the pressure difference $\Delta P_{t=Pu,t-Pd,t}$ and the ratio of the present difference $$X_{p,t} = \frac{\Delta P_t}{P_{u,t}}$$

After closing the valve 28, the process of determining a flow rate of a fluid substance discharged from a reserving device is completed. The pressure and temperature in the reserving device are determined for calculating the final mass $m_{r,t=f}$ of the fluid substance. The difference between $m_{r,t=0}$ and $m_{r,t=f}$ is the summation of all the instantaneous flow rates of the fluid substance.

Figure 3:
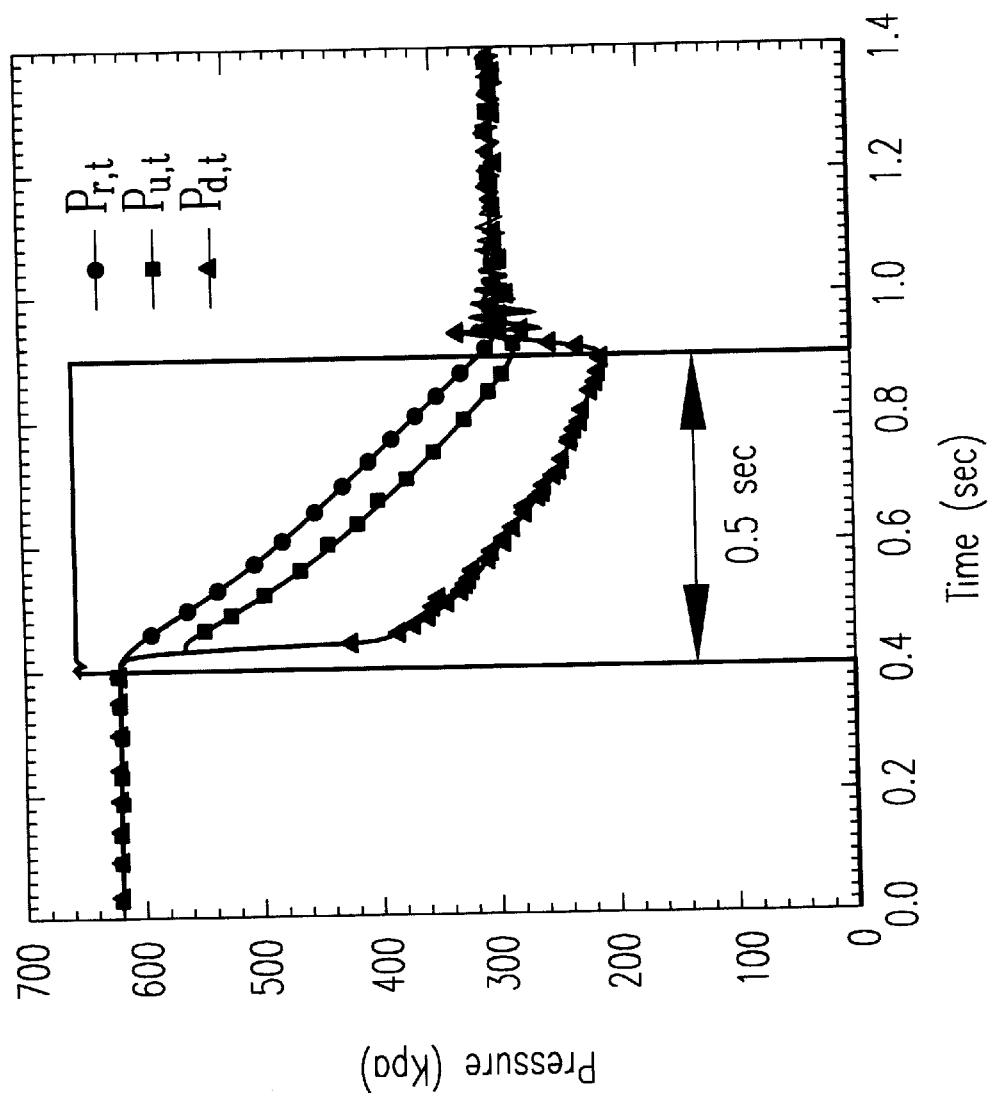
FIG. 3 is a pressure vs. time graph of a fluid substance discharged from a reserving device according to the present invention.
Figure 4:
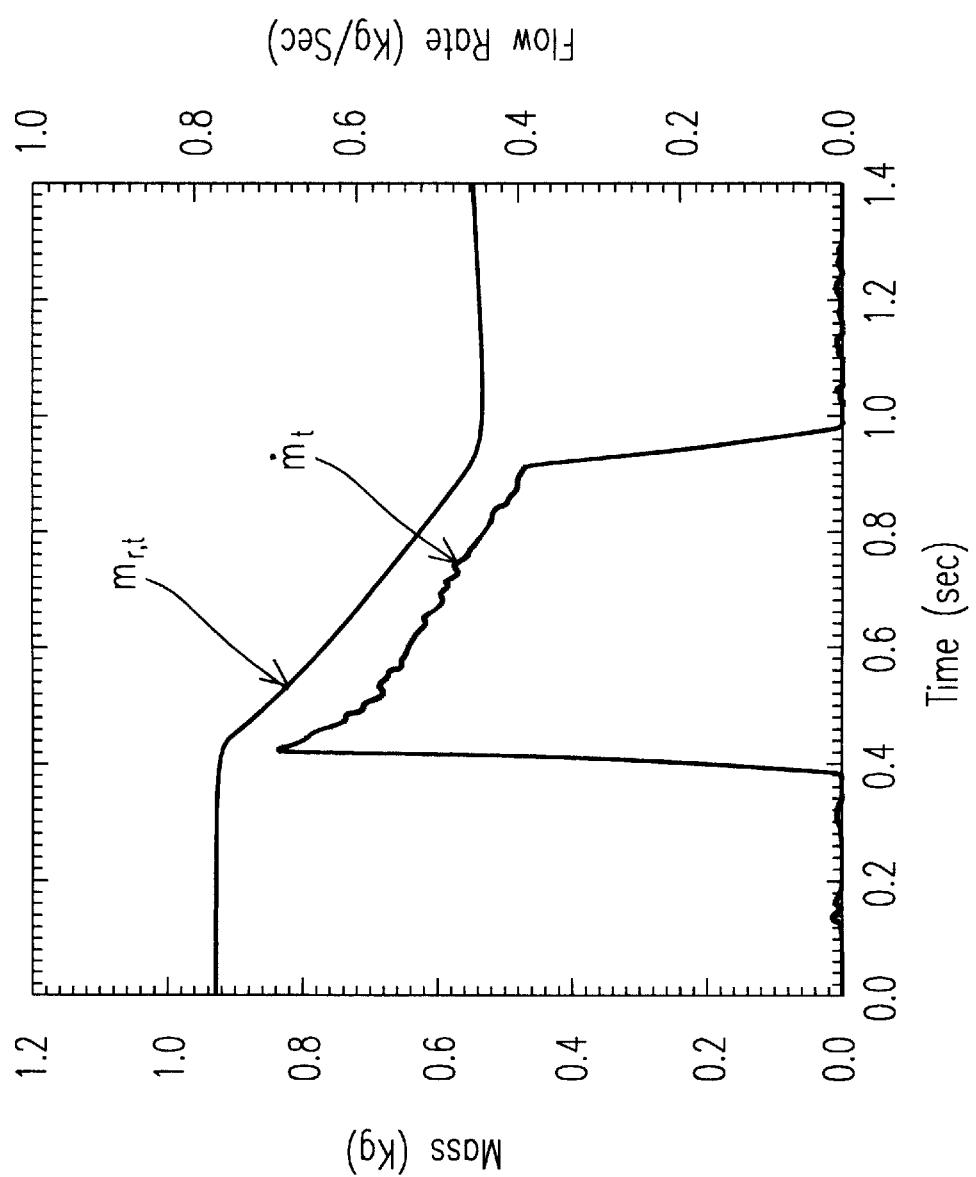
FIG. 4 is a flow rate vs. time graph of a fluid substance discharged from a reserving device according to the present invention.
Figure 5:
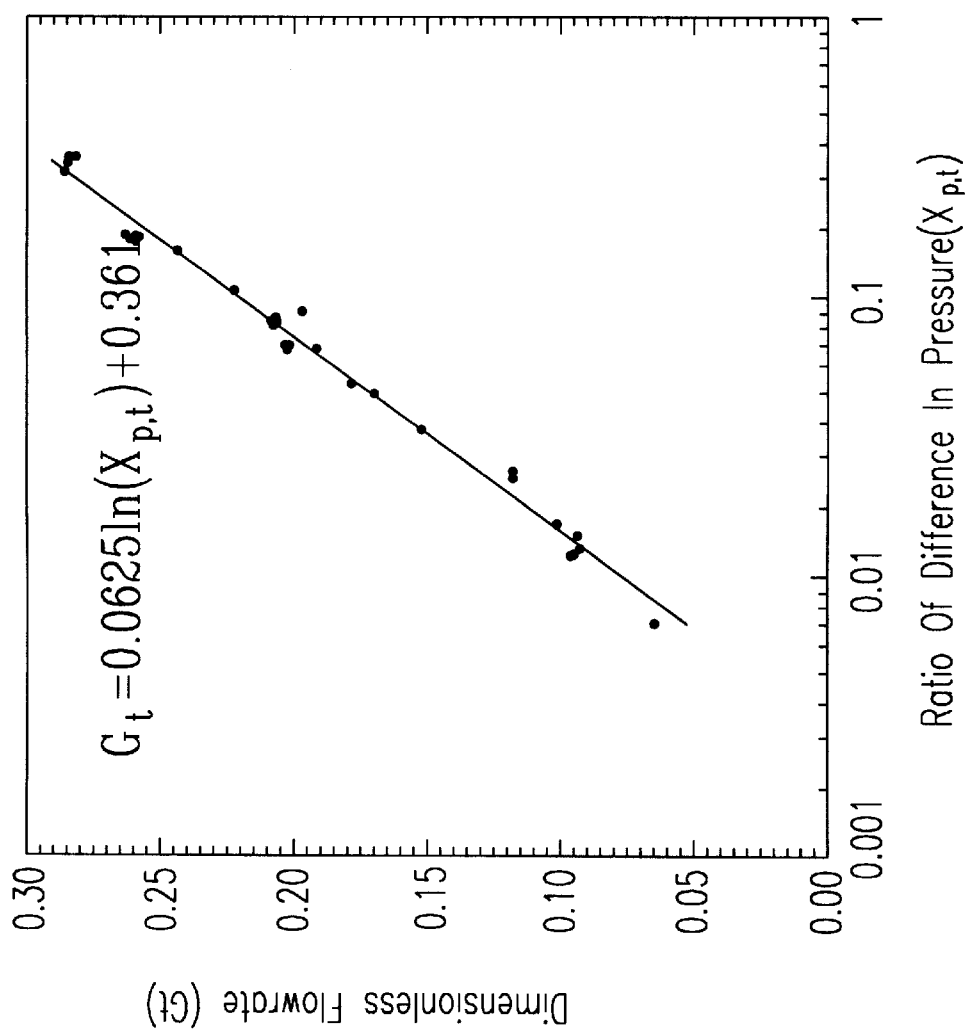
FIG. 5 is a dimensionless flow rate vs. the ratio of the pressure difference according to the present invention.

The compressible gas with a pressure of six atm is introduced into the reserving device 2 by a compressor. After the stabilization of the air, the pressure and the temperature in the reserving device are recorded for calculating the mass of the air in the reserving device. The discharged time is defined as 0.5 second. Referring to FIG. 3, all of the pressures in the reserving device $P_{r,t}$, the upstream region of the valve $P_{u,t}$, and the downstream region of the valve $P_{d,t}$ are recorded by the data processor 23. The amount of $$\frac{dP_{r,t}}{dt}$$

is then calculated. Referring to FIG. 4, the mass of the fluid substance $m_{r,t}$ and the instantaneous flow rate $\dot{m}$ of the fluid substance are calculated from Eq. (6) and Eq. (8). Thereafter, the relationship between the ratio $X_{p,t}$ and the dimensionless flow rate $G_t$ is shown in FIG. 5.

After repeating the above-mentioned process many times, the results are shown in Table 1. The initial mass $m_{r,t=0}$ of the air, the final mass $m_{r,t=f}$ of the air, the difference ($\Delta m_{i,f}$) between $m_{r,t=0}$ and $m_{r,t=f}$, and the summation of all the instantaneous flow rates of the air $\Sigma(\dot{m}_{r,t} \times \Delta t)$ are all shown in Table 1. The error between $\Delta m_{i,f}$ and $\Sigma(\dot{m}_{r,t} \times \Delta t)$ is small than 6%. Therefore, the method for determining a flow rate of a fluid substance discharged from a reserving device according to the present invention is very effective and the accuracy of the method is very high.

Further, the instantaneous flow rate $\dot{m}$ of the fluid substance can also be calculated from the change of the temperature. The equation shown below is also derived from Eq. (1):

$$\dot{m} = (1-\gamma)m_{r,t=0}\left[\frac{T_{r,t}}{T_{r,t=0}}\right]^{\frac{2-\gamma}{\gamma-1}}\frac{dT_{r,t}}{dt}, \gamma = \frac{C_p}{C_v}$$

where $m_{r,t=0}$ is the initial mass of the fluid substance, $T_{r,t=0}$ is the initial temperature in the reversing device, $T_{r,t}$ is the temperature varying with time in the reversing device, and $\gamma$ is the specific heat ratio.

The apparatus according to the present invention can determine a flow rate of a fluid substance discharged from a reserving device in a dynamic state. The accuracy of the method is very high. The apparatus according to the present invention does not need a huge supply of the fluid substance to maintain a steady state during the discharged process, so it can be easily used in a factory.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

TABLE 1

| (1) Time (msec) | (2) $m_{r,t=0}$ initial mass (Kg) | (3) $m_{r,t=f}$ final mass (Kg) | (4) $\Delta m_{i,f}=$ (2)–(3) (Kg) | (5) $m_{r,t=0}-\Sigma(\dot{m}_{r,t} \times \Delta t)$ (Kg) | (6) $\Delta m_{cal}=$ (2)–(5) (Kg) | (7) Accuracy $= (6)-(4)$ / (4) (%) |
|---|---|---|---|---|---|---|
| 1 | 100 | 0.622 | 0.529 | 0.093 | 0.532 | 0.090 | –2.97% |
| 2 | 100 | 0.627 | 0.527 | 0.100 | 0.532 | 0.095 | –5.19% |
| 3 | 100 | 0.631 | 0.531 | 0.100 | 0.535 | 0.096 | –4.00% |
| 4 | 100 | 0.782 | 0.330 | 0.452 | 0.347 | 0.435 | –3.76% |
| 5 | 200 | 0.627 | 0.466 | 0.161 | 0.473 | 0.154 | –4.50% |
| 6 | 200 | 0.629 | 0.468 | 0.161 | 0.474 | 0.155 | –3.75% |
| 7 | 200 | 0.760 | 0.460 | 0.300 | 0.474 | 0.286 | –4.62% |
| 8 | 200 | 0.780 | 0.464 | 0.316 | 0.477 | 0.302 | –4.33% |
| 9 | 300 | 0.635 | 0.418 | 0.216 | 0.426 | 0.208 | –3.64% |
| 10 | 300 | 0.633 | 0.415 | 0.218 | 0.424 | 0.210 | –3.96% |
| 11 | 400 | 0.631 | 0.367 | 0.264 | 0.378 | 0.253 | –4.12% |
| 12 | 400 | 0.626 | 0.367 | 0.259 | 0.375 | 0.251 | –2.98% |
| 13 | 500 | 0.926 | 0.859 | 0.067 | 0.861 | 0.065 | –2.88% |
| 14 | 500 | 0.924 | 0.805 | 0.119 | 0.809 | 0.115 | –3.68% |
| 15 | 500 | 0.763 | 0.596 | 0.167 | 0.601 | 0.161 | –3.30% |
| 16 | 500 | 0.920 | 0.693 | 0.227 | 0.703 | 0.217 | –4.24% |
| 17 | 500 | 0.925 | 0.616 | 0.309 | 0.629 | 0.295 | –4.38% |
| 18 | 500 | 0.908 | 0.536 | 0.372 | 0.550 | 0.358 | –3.74% |
| 19 | 500 | 0.765 | 0.433 | 0.332 | 0.447 | 0.318 | –4.13% |
| 20 | 500 | 0.907 | 0.491 | 0.416 | 0.507 | 0.401 | –3.70% |
| 21 | 750 | 0.785 | 0.407 | 0.378 | 0.422 | 0.363 | –3.84% |
| 22 | 750 | 0.790 | 0.411 | 0.380 | 0.425 | 0.366 | –3.61% |
| 23 | 1000 | 0.635 | 0.286 | 0.348 | 0.301 | 0.334 | –4.12% |
| 24 | 1000 | 0.788 | 0.333 | 0.454 | 0.349 | 0.438 | –3.49% |

What is claimed is:

1. An apparatus for determining a flow rate of a fluid substance discharged from a reserving device comprising:

an instantaneous sensor for measuring an instantaneous state parameter of said fluid substance stored in said reserving device; and a data processor electrically connected with said instantaneous sensor for calculating said flow rate of said fluid substance according to said instantaneous state parameter, wherein said flow rate of said fluid substance is determined by an equation $$\dot{m} = -\frac{dm_{r,t}}{dt} = -\frac{1}{\gamma}\frac{m_{r,t=0}}{P_{r,t}}\left[\frac{P_{r,t}}{P_{r,t=0}}\right]^{\frac{1}{\gamma}}\frac{dP_{r,t}}{dt}$$

where $\dot{m}$ is said flow rate of said fluid substance, $m_{r,t}$ is the mass of said fluid substance in said reserving device, $m_{r,t=0}$ is the initial mass of said fluid substance in said reserving device, $P_{r,t=0}$ is the initial pressure in said reserving device, $P_{r,t}$ is the pressure varying with time in said reserving device, and $\gamma$ is the specific heat ratio of said fluid substance.

2. The apparatus according to claim 1 wherein said reserving device further comprises:

a reservoir for storing said fluid substance;

a controlling valve linked to said reservoir for adjusting said flow rate of said fluid substance; and a tube linked to said valve for transporting said fluid substance.

3. The apparatus according to claim 2 wherein said controlling valve further comprises:
- an adjustable valve connected to said reservoir for enabling/disabling said fluid substance to be discharged from said reservoir; and
- a controller electrically connected to said adjustable valve for controlling said adjustable valve.

4. The apparatus according to claim 3 wherein said adjustable valve is one selected from a group consisting of a ball valve, an electromagnetic valve, and a diaphragm valve.

5. The apparatus according to claim 1 wherein said instantaneous sensor is a thermocouple when said state parameter is the temperature of said fluid substance.

6. The apparatus according to claim 1 wherein said instantaneous sensor is a manometer when said state parameter is the pressure of said fluid substance.

7. The apparatus according to claim 1 wherein said data processor is a computer.

8. A method for determining a flow rate of a fluid substance discharged from a reserving device comprising steps of:
- (a) calculating an initial mass $m_{r,t=0}$ of said fluid substance in said reserving device;
- (b) defining a discharged time and then discharging said fluid substance from said reserving device;
- (c) measuring a pressure $P_{r,t}$ in said reserving device;
- (d) measuring a temperature $T_{r,t}$ in said reserving device; and
- (e) calculating said flow rate $\dot{m}$ of said fluid substance.

9. The method according to claim 8 wherein said step (a) further comprises steps of:
- measuring an initial pressure $P_{r,t=0}$ in said reserving device;
- measuring an initial temperature $T_{r,t=0}$ in said reserving device; and
- calculating said initial mass of said fluid substance by an equation $PV=mRT$.

10. The method according to claim 8 wherein said flow rate of said fluid substance is determined by an equation $$\dot{m} = -\frac{dm_{r,t}}{dt} = -\frac{1}{\gamma}\frac{m_{r,t=0}}{P_{r,t}}\left[\frac{P_{r,t}}{P_{r,t=0}}\right]^{\frac{1}{\gamma}}\frac{dP_{r,t}}{dt}$$

where $\dot{m}$ is said flow rate of said fluid substance, $m_{r,t}$ is the mass of said fluid substance in said reserving device, $m_{r,t=0}$ is the initial mass of said fluid substance in said reserving device, $P_{r,t=0}$ is the initial pressure in said reserving device, $P_{r,t}$ is the pressure varying with time in said reserving device, and $\gamma$ is the specific heat ratio of said fluid substance.

11. The method according to claim 8 wherein said flow rate of said fluid substance is determined by an equation $$\dot{m} = (1-\gamma)m_{r,t=0}\left[\frac{T_{r,t}}{T_{r,t=0}}\right]^{\left(\frac{2-\gamma}{\gamma-1}\right)}\frac{dT_{r,t}}{dt}$$

where $\dot{m}$ is said flow rate of said fluid substance, $m_{r,t=0}$ is the initial mass of said fluid substance in said reserving device, $T_{r,t=0}$ is the initial temperature in said reserving device, $T_{r,t}$ is the temperature varying with time in said reserving device, and $\gamma$ is the specific heat ratio of said fluid substance.

12. An apparatus for determining a flow rate of fluid substance discharged from a reserving device comprising:
- an instantaneous sensor for measuring an instantaneous state parameter of said fluid substance stored in said reserving device; and
- a data processor electrically connected with said instantaneous sensor for calculating said flow rate of said fluid substance according to said instantaneous state parameter, wherein said flow rate of said fluid substance is determined by an equation $$\dot{m} = (1-\gamma)m_{r,t=0}\left[\frac{T_{r,t}}{T_{r,t=0}}\right]^{\left(\frac{2-\gamma}{\gamma-1}\right)}\frac{dT_{r,t}}{dt}, \text{ where}$$

where $\dot{m}$ is said flow rate of said fluid substance, $m_{r,t=0}$ is the initial mass of said fluid substance in said reserving device, $T_{r,t=0}$ is the initial temperature in said reserving device, $T_{r,t}$ is the temperature varying with time in said reserving device, and $\gamma$ is the specific heat ratio of said fluid substance.

* * * * *

UNITED STATES PATENT AND TRADEMARK OFFICE
CERTIFICATE OF CORRECTION

PATENT NO. : 6,249,748 B1  
DATED : June 19, 2001  
INVENTOR(S) : Fu

Page 1 of 1

It is certified that error appears in the above-identified patent and that said Letters Patent is hereby corrected as shown below:

<u>Title page,</u>  
ABSTRACT, Item [57], after "of", insert -- a --.

<u>Column 2,</u>  
Lines 31 and 45, "m", both occurrences, should read -- $\dot{m}$ --.

<u>Column 3,</u>  
Line 61, $$\frac{d}{dt}(m_{r,t}, e_{r,t}) = \frac{dm_{r,t}}{dt} h_{r,t}$$

"                                                                                                   "

$$\gamma = \frac{C_p}{C_v}$$

should read $$\frac{d}{dt}(m_{r,t}\, e_{r,t}) = \frac{d\dot{m}_{r,t}}{dt} \dot{h}_{r,t}$$

-- --.

where $de_{r,t} = C_v dT_{r,t}$, $h_{r,t} = C_p T_{r,t}$ and $\gamma = \frac{C_p}{C_v}$ Signed and Sealed this Fifth Day of February, 2002

Attest:

*Attesting Officer*

JAMES E. ROGAN  
*Director of the United States Patent and Trademark Office*